United States Patent [19]
Broshi et al.

[11] Patent Number: 6,008,172
[45] Date of Patent: *Dec. 28, 1999

[54] NON-TOXIC, PLEASANT TASTING BUBBLE MAKING COMPOSITION

[76] Inventors: Oded Broshi, 37 Ashkenazi Street, Tel Aviv, 69864, Israel; Robert W. Hartley, 446 Leeds St., Akron, Ohio 40305; Richard J. Vetrone, 920 Kenner Dr., Medina, Ohio 44256

[ * ] Notice: This patent issued on a continued prosecution application filed under 37 CFR 1.53(d), and is subject to the twenty year patent term provisions of 35 U.S.C. 154(a)(2).

[21] Appl. No.: 08/589,054

[22] Filed: Jan. 19, 1996

Related U.S. Application Data

[63] Continuation-in-part of application No. PCT/US95/07369, Jun. 8, 1995.

[30] Foreign Application Priority Data

Jun. 9, 1994 [IL] Israel ......................................... 109965

[51] Int. Cl.$^6$ .............................. A63H 33/28; C11D 1/12; C11D 3/37
[52] U.S. Cl. ........................... 510/135; 510/426; 510/437; 510/421; 510/463; 510/470; 510/471; 510/474; 510/481; 510/493; 510/499; 424/49; 424/56; 426/104; 252/307; 446/15
[58] Field of Search .................................... 510/135, 426, 510/437, 421, 463, 470, 471, 474, 481, 493, 499; 424/49, 56; 426/104; 252/307; 446/15

[56] References Cited

U.S. PATENT DOCUMENTS

| | | |
|---|---|---|
| 519,923 | 5/1894 | McNaughton . |
| 2,433,625 | 12/1947 | Raspet ...................................... 252/307 |
| 2,469,045 | 5/1949 | Vietes .................................. 252/307 |
| 3,630,951 | 12/1971 | Netherly .................................. 252/307 |
| 3,669,000 | 6/1972 | Segel et al. .................................. 99/48 |
| 4,150,151 | 4/1979 | Pader et al. ................................ 424/56 |
| 4,284,534 | 8/1981 | Ehrlich ..................................... 252/542 |
| 4,313,765 | 2/1982 | Baird et al. ............................. 106/197 |
| 4,511,497 | 4/1985 | Ehrlich ..................................... 252/542 |
| 4,668,422 | 5/1987 | Malik et al. ........................ 252/174.17 |
| 4,729,900 | 3/1988 | Clare et al. ............................. 426/329 |
| 4,869,898 | 9/1989 | Gaffar et al. ............................... 424/52 |
| 5,004,623 | 4/1991 | Giddey et al. ........................... 526/564 |
| 5,028,412 | 7/1991 | Putt et al. ................................. 424/48 |
| 5,037,633 | 8/1991 | Ziemkiewicz et al. ................... 424/49 |
| 5,153,014 | 10/1992 | Cole, Jr. ................................. 426/302 |
| 5,165,951 | 11/1992 | Gallart et al. ........................... 426/572 |
| 5,182,099 | 1/1993 | Jonsson et al. ............................ 424/49 |
| 5,318,784 | 6/1994 | Ream et al. ............................. 426/522 |

FOREIGN PATENT DOCUMENTS

| | | |
|---|---|---|
| 0 081 406 A1 | 6/1983 | European Pat. Off. . |
| 1 049 352 | 1/1959 | Germany . |
| 130250 | of 1919 | United Kingdom . |

OTHER PUBLICATIONS

Food Chemistry, Second Edition, Fennema (ed), Marcel Dekker, Inc. New York, 1985, p. 279, line 22–28.
Grant, Roger and Claire, Grant & Hackh's Chemical Dictionary, p. 265, 1987.
Sax and Lewis, Hawley's Condensed Chemical Dictionary, pp. 1081–1082, 1987.
Kirk–Othmer, Encyclopedia of Chemical Technology, Third Edition, vol. 3, pp. 784–786.
Kirk–Othmer, Encyclopedia of Chemical Technology, Third Edition, vol. 22, p. 506.
The Toy Book, Dec. 1990, p. 5.

*Primary Examiner*—Yogendra Gupta
*Assistant Examiner*—Charles Boyer
*Attorney, Agent, or Firm*—Cowan, Liebowitz & Latman, P.C.; William H. Dippert; Morey B. Wildes

[57] ABSTRACT

An aqueous-based, pleasant tasting, non-toxic bubble-making composition of at least one surfactant, at least one bubble-stabilizer functionally compatible with the selected surfactant(s) and other constituents of the composition, appearing in quantities relative to each other and the composition as a whole sufficient to produce bubbles of the desired form, size and stability but non-toxic if consumed orally in substantial quantities by a child, and at least one taste-enhancing agent functionally compatible with the composition as a whole in quantities relative thereto to produce a bubble-making composition which is relatively pleasant tasting.

14 Claims, No Drawings

NON-TOXIC, PLEASANT TASTING BUBBLE MAKING COMPOSITION

This application is a CIP of PCT/US95/07369 filed Jun. 8, 1995.

FIELD OF THE INVENTION

The present invention generally relates to bubble making compositions and specifically to a non-toxic, pleasant tasting bubble making solution suitable for use by children who frequently place the bubbles on their tongues or otherwise put the composition into their mouths.

BACKGROUND OF INVENTION

A wide variety of bubble making compositions are known in the prior art which are suitable for generating stable bubbles of widely varying sizes by a number of different techniques, such a bubble-blowing pipes or closed rings which are dipped in the bubble making liquid and then waved through the air or blown against to generate bubbles.

Children frequently catch the bubbles on their tongues or put small quantities of the bubble liquid into their mouths. Most commercially available liquid bubble making compositions contain an alkyl aryl benzene sulfonate surfactant which produces highly stable, large bubbles but, regrettably is exceedingly bitter tasting and, if consumed in sufficient quantities, likely to cause illness. Therefore, the use of such compositions by small children, should be carefully supervised.

Other surfactants commonly used in bubble making compositions, such as some of the soaps, are irritating to the eyes as well as unpleasant tasting.

Most bubble making compositions are generally aqueous solutions or mixtures containing a surfactant and one or more bubble stabilizers. However, the selection of the proper combination and relative concentrations of surfactant and bubble stabilizer is quite critical to the character, size and stability of the bubble generated as well as the temperature/time related stability of the liquid composition itself. When other ingredients are added to the mixture, undesirable interactions can occur adversely affecting the stability of the composition. Therefore, the preparation of a bubble making composition which is relatively non-toxic, pleasant tasting but generates durable, long lasting bubbles of the proper size and which is both time and temperature stable is a demanding task.

OBJECTS OF THE INVENTION

It is among the objects and advantages of the present invention to provide a liquid, bubble-making composition which is pleasant tasting, non-toxic and non-irritating which will generate large, durable bubbles.

It is also among the objects and advantages of the present invention to provide a bubble-making composition having the above characteristics which is both time and temperature stable.

It is yet another object and advantage of the present invention to provide a bubble-making composition having the above characteristics which may be used in a wide variety of bubble-making devices such as bubble pipes and bubble-blowing rings.

These and other objects and advantages may be achieved by the compositions hereinafter described and claimed.

SUMMARY OF THE INVENTION

A pleasant-tasting, non-toxic, aqueous-based, bubble-making composition consisting essentially of a suitable surfactant(s), the taste of which can be enhanced sufficiently to make the composition reasonably pleasant, a bubble-stabilizer(s) functionally compatible with the surfactant(s), one or more edible taste-enhancing agent(s) including sweeteners and flavoring agents, stabilizing agents suitable for attenuating the formation of bacteria which would adversely affect the bubble-making characteristics of the composition and, depending upon the surfactant selected, a time and temperature stabilizer.

DETAILED DESCRIPTION OF INVENTION

The composition of the present invention is an aqueous-based mixture of a surfactant, a viscosity-increasing and bubble-form stabilizer, ("bubble-stabilizer"), and a sweetening or flavoring agent together with certain essential additives depending upon the surfactant and sweetening agent(s) selected.

Many surfactants are useful in bubble-making compositions such as the alkyl aryl benzene sulfonates, sorethytan (20) mono-stearate and mono-oleate, soaps such as sodium stearate and sodium oleate, and sodium lauryl sulfate. However, the criteria of bubble characteristics, time and temperature stability of the composition as a whole including the sweetening agents selected, taste, non-toxicity and low irritability limits the choices available to achieve the desired end result.

It has been found that sodium lauryl sulfate provides the characteristics of taste which can be enhanced by sweetening agents, acceptable toxicity at functionally useful concentrations and functionally suitable bubble-making characteristic when employed with a functionally compatibly bubble-stabilizer.

The alkyl aryl benzene sulfonates produce suitable bubbles but are excessively bitter and are more toxic than sodium lauryl sulfate at the concentrations necessary to produce desirable bubble characteristics. The soaps, stearates and oleates, are irritating to the eyes, are bad tasting and do not produce the high level bubble-making characteristics of the alkyl aryl benzene sulfonates. Therefore, while the taste of the alkyl aryl benzene sulfonates and soaps can be enhanced by the presence of sweetening or flavoring agents, their use results in far more inferior overall results than sodium lauryl sulfate.

The concentration of the surfactant in well-known bubble making compositions is a function of both the combination of surfactant(s) and bubble-stabilizer(s) selected and the character of the bubbles desired. Generally speaking, the surfactant can appear in concentrations from 0.1 to 60% by weight of the composition depending upon the surfactant/bubble-stabilizer combination selected and the characteristics of the bubbles desired. However, in a composition in which sodium lauryl sulfate is the sole surfactant and is yet pleasant tasting, the maximum concentration is governed by considerations of taste which must be overcome by a sweetening or flavoring agent(s) and toxicity which as used herein means that if swallowed by a child in substantial quantities, it will not result in serious illness. The minimum concentration is governed by considerations of bubble character and stability. The range for sodium lauryl sulfate is that just sufficient to form the character of bubble desired. While it can be used in ranges from about 0.3 grams to 10 grams in 100 grams of distilled water, 0.5 grams is sufficient to produce high quality bubbles with the commonly employed children's devices such as pipes and rings providing a functionally suitable and compatibly bubble-stabilizer is employed.

If significantly higher concentrations of sodium lauryl sulfate than 0.5 grams in 100 grams of water is employed, the composition is more likely to cause illness such as diarrhea if swallowed in substantial quantities by a child. Moreover, the taste is more difficult to cover to acceptable levels by the sweetening or flavoring agent.

A viscosity-increasing and bubble-form stabilizing agent ("bubble-stabilizing agent" or "bubble-stabilizer") is also required. There are many bubble-stabilizing agents known in the art such as glycerin, carboxy methyl cellulose, methyl cellulose, starch, gelatine, ethyl methyl cellulose, cream of tartar, carrageenan gum, sodium alginate, xanthan gum, guar gum, gum arabic and locust bean gum. In the present invention, the selection of the bubble-stabilizer is governed by a number of factors including its functional compatibility with the other ingredients of the composition, particularly the surfactant selected, as well as taste and toxicity. It has been found that, all factors taken into consideration, a combination of xanthum gum and hydroxy propyl methyl cellulose is preferred when employing sodium lauryl sulfate as the surfactant. As in the case of the surfactant, the concentration of the bubble-stabilizer(s) is a function of it or their functional compatibility with the surfactant as well as other ingredients of the composition, taste and toxicity. The range of concentration of the above preferred bubble-stabilizers based on 100 grams of distilled water and 0.5 grams of sodium lauryl sulfate, is about 0.1 grams to 0.3 grams each of xanthum gum and Hydroxy propyl methyl cellulose with 0.3 grams of each being preferred.

While sodium lauryl sulfate is considerably less bitter tasting and toxic than the commonly employed alkyl aryl benzene sulfonates, it nevertheless needs a taste-enhancing agent to make it pleasant tasting. Since sodium lauryl sulfate has a bitter taste, a sweetening agent is very effective to produce a taste which is at least acceptable if not pleasant. A non-sweetening flavoring agent is less effective in countering the bitter taste than a sweetening agent. Among the suitable sweetening agents are the naturally occurring sugars such as dextrose as well as synthetic sweeteners such as acesulfame, aspartame, cyclamic acid and its sodium and calcium salts, saccharin and its sodium and calcium salts, taumatin and neohesphidrin. The concentration of the sweetening agent is a function of the amount needed to achieve the desired level of taste. This, in turn is a function of the taste of other ingredients particularly the surfactant and their concentrations.

In the preferred embodiment of the present invention when employing sodium lauryl sulfate as the surfactant and the combination of xanthum gum and hydroxy propyl methyl cellulose as the bubble-stabilizing agents, the preferred sweetening agents are a combination of aspartame and dextrose each in the amount of 0.5 grams based on 0.5 grams of sodium lauryl sulfate in 100 grams of distilled water. The upper limit of the concentration of sweetening agent(s) is a function of it or their functional effect, if any, on the making of bubbles. However, in the preferred embodiment of the present invention, the concentration is kept to the minimum necessary to just achieve the degree of sweetening desired.

Aspartame is desirable because of its very high sweetening capabilities in amounts less than natural sugars and, in many instances, less than other synthetic sweeteners. Moreover, some of the other synthetic sweeteners leave an unpleasant (metallic) aftertaste.

While in the present invention, the preferred embodiment employs sodium lauryl sulfate as the surfactant, it has been found that aspartame degrades and supports the development of bacteria, which while harmless to humans, virtually destroys the bubble-making capabilities of the composition over a short period of time. Accordingly, it is necessary to employ a preservative in quantities just sufficient to attenuate the formation of bacteria to the degree necessary. This in turn is a function of the preservative selected. In the preferred embodiment of the present invention, benzoic acid in employed in quantities just sufficient to achieve the desired level of attenuation of bacteria development. When employing 0.5 grams of sodium lauryl sulfate as the surfactant, 0.3 grams each of xanthum gum and hydroxy propyl methyl cellulose as bubble-stabilizers and 0.5 grams each of aspartame and dextrose as sweetening agents all in 100 grams of distilled water, 0.5 grams of benzoic acid provides the desired level of bacteria attenuation.

It has also been found that in the preferred embodiment employing sodium lauryl sulfate, xanthum gum, hydroxy propyl methyl cellulose, aspartame and dextrose, the bubble-forming characteristics are very unstable with respect to both time and temperature. Over a period of time, the bubble-making capabilities of the composition frequently degrade sufficiently to make the composition practically useless. Similarly, if the composition is chilled, particularly to levels approaching the freezing point of water, the bubble-making capabilities of the preferred composition are lost virtually in their entirety and cannot be significantly regained by heating. This effectively precludes refrigerating the composition which could aid in the attenuation of the formation of bacteria.

It has been found the time/temperature stability of the preferred embodiment of the present invention can be substantially improved by the addition of sodium chloride. The concentration of the sodium chloride should be just sufficient to achieve the degree of stabilization desired. In a composition containing 100 grams of distilled water, 0.5 grams of sodium lauryl sulfate, 0.5 grams each of xanthan gum and hydroxy propyl methyl cellulose, and 0.3 grams each of aspartame and dextrose, about 0.7 grams of sodium chloride is sufficient to achieve the desired level of time/temperature stability.

Flavoring agents can be employed in addition to or substitution for sweetening agent(s) depending upon the taste desired. There are a wide variety of flavoring agents available which are suitable for human consumption. However, it has been found that flavoring agents containing alcohol degrade the bubble-making capabilities of the composition and should be avoided.

Coloring agents may be employed if desired. As in the case of flavoring agents, the coloring agents must be safe for human consumption and functionally compatible with the other ingredients of the composition at the concentrations employed.

The following examples are presented merely by way of illustration and without intending to limit the scope of the present invention defined by the claims appended hereto.

EXAMPLE 1

The following composition is suitable for generating stable, large bubbles from pipes or rings, is predominantly sweet tasting, non-toxic even if consumed in substantial quantities by a child and constitutes the best mode of the present invention.

Distilled Water: - - - 100 grams
Sodium Lauryl Sulfate: - - - 0.5 grams
Aspartame: - - - 0.5 grams Dextrose: - - - 0.5 grams
Xanthan gum: - - - 0.3 grams
Hydroxy Propyl Methyl Cellulose: - - - 0.3 grams
Benzoic Acid: - - - 0.5 grams
Sodium Chloride: - - - 0.7 grams

EXAMPLE 2

The following composition produces satisfactory bubbles from pipes or rings, is predominantly sweet tasting, and is non-toxic even if consumed in substantial quantities by a child.

Distilled Water: - - - 100 grams
Sodium Lauryl Sulfate: - - - 0.3 grams
Aspartame: - - - 0.5 grams
Dextrose: - - - 0.5 grams
Xanthum Gum: - - - 0.1 grams
Hydroxy Propyl Methyl Cellulose: - - - 0.1 grams
Benzoic Acid: - - - 0.1 grams
Sodium Chloride: - - - 0.7 grams

EXAMPLE 3

The compositions in accordance with Examples 1 or 2 to which is added a compatible, non-toxic flavoring agent in quantities just sufficient to achieve the desired taste and which contains either no or sufficiently low quantities of alcohol or other ingredients which would unacceptably adversely affect the bubble-making characteristics of the composition.

EXAMPLE 4

The compositions in accordance with any one of Examples 1, 2 or 3 to which is added a compatible, non-toxic coloring agent just sufficient to achieve the desired color.

EXAMPLE 5 sodium lauryl sulfate: - - - 1% by weight of the composition ("w/w")
glycerine: - - - 100 w/w
aspartame: - - - 0.1 w/w
flavoring agent: - - - 0.1 w/w
distilled water: - - - sufficient to make 100 grams of composition

We claim:

1. A non-toxic bubble making composition comprising:
   (a) water,
   (b) sodium lauryl sulfate in a quantity of from about 0.1 gram to about 0.5 gram per 100 grams of water,
   (c) xanthan gum and hydroxy propyl methyl cellulose, wherein each of said xanthan gum and said hydroxy propyl methyl cellulose is present in a quantity sufficient to produce bubbles with said sodium lauryl sulfate which have a desired form, size, and stability, and
   (d) one or more agents selected from the group consisting of edible sweetening agents and edible taste-enhancing agents functionally compatible in said composition as a whole, said one or more agents being present in a quantity sufficient to achieve a desired taste.

2. The composition in accordance with claim 1, in which the taste-enhancing agent includes aspartame.

3. The composition in accordance with claim 1, in which the taste-enhancing agent is a combination of dextrose and aspartame.

4. The composition of claim 1, and further comprising sodium chloride, wherein said sodium chloride is present in a quantity sufficient to stabilize said sodium lauryl sulfate for a desired time and at a desired temperature.

5. The composition in accordance with claim 1 and further comprising a bacteria attenuating agent, said bacteria attenuating agent being present in a quantity sufficient to attenuate the growth of bacteria which are deleterious to the bubble making capabilities of said sodium lauryl sulfate.

6. The composition in accordance with claim 5, and further comprising sodium chloride, said sodium chloride being present in a quantity sufficient to stabilize said sodium lauryl sulfate for a desired time and at a desired temperature.

7. The composition of claim 1, wherein the taste enhancing agent includes aspartame, and said composition further comprises a bacteria attenuating agent and said bacteria attenuating agent being present in a quantity sufficient to attenuate the growth of bacteria which are deleterious to the bubble making capabilities of said sodium lauryl sulfate, and sodium chloride, said sodium chloride being present in a quantity sufficient to stabilize said sodium lauryl sulfate for a desired time and at a desired temperature.

8. The composition in accordance with claim 1, wherein each of said xanthan gum and said hydroxy propyl methyl cellulose is present in a quantity of from about 0.1 to about 0.3 gram per 100 grams of water.

9. The composition in accordance with claim 1, wherein each of said xanthan gum and said hydroxy propyl methyl cellulose is present in a quantity of from about 0.1 to about 0.3 gram per 100 grams of water, and wherein said taste-enhancing agent includes dextrose and aspartame wherein each of said dextrose and said aspartame is present in a quantity of about 0.5 gram per 100 grams of water, and further comprising a bacteria attenuating agent, said bacteria attenuating agent being present in a quantity sufficient to attenuate the growth of bacteria which are deleterious to the bubble making capabilities of said sodium lauryl sulfate.

10. The composition in accordance with claim 1, wherein each of said xanthan gum and said hydroxy propyl methyl cellulose is present in a quantity of from about 0.1 to about 0.3 gram per 100 grams of water and wherein said taste-enhancing agent includes dextrose and aspartame, wherein each of said dextrose and said aspartame is present in a quantity of about 0.5 gram per 100 grams of water, and wherein said composition further comprises a bacteria attenuating agent wherein said bacteria attenuating agent is present in a quantity sufficient to attenuate the growth of bacteria which are deleterious to the bubble making capabilities of said sodium lauryl sulfate, and sodium chloride wherein said sodium chloride is present in a quantity sufficient to stabilize said sodium lauryl sulfate for a desired time and at a desired time and at a desired temperature.

11. The composition in accordance with claim 1, wherein each of said xanthan gum and said hydroxy propyl methyl cellulose is present in a quantity of about 0.1 to about 0.3 gram per 100 grams of water, and said taste-enhancing agent includes dextrose and aspartame, wherein each of said dextrose and said aspartame is present in a quantity of about 0.5 gram per 100 grams of water, and wherein said composition further comprises benzoic acid wherein said benzoic acid is present in a quantity sufficient to attenuate the growth of bacteria which are deleterious to the bubble making capabilities of said sodium lauryl sulfate, and sodium chloride, wherein said sodium chloride is present in a quantity sufficient to stabilize said sodium lauryl sulfate for a desired time and at a desired temperature.

12. The composition in accordance with claim 1, wherein each of said xanthan gum and said hydroxy propyl methyl cellulose is present in a quantity of from about 0.1 to about 0.3 gram per 100 grams of water, and said taste-enhancing agent includes dextrose and aspartame, wherein each of said dextrose and said aspartame is present in a quantity of about 0.5 gram per 100 grams of water, and wherein said composition further comprises benzoic acid wherein said benzoic acid is present is a quantity of from about 0.1 gram to about 0.5 gram per 100 grams of water, and sodium chloride, wherein said sodium chloride is present in a quantity sufficient to stabilize said sodium lauryl sulfate for a desired time and at a desired temperature.

13. The composition in accordance with claim 1, wherein each of said xanthan gum and said hydroxy propyl methyl cellulose is present in a quantity of from about 0.1 to about 0.3 gram per 100 grams of water, and said taste-enhancing agent includes dextrose and aspartame, wherein each of said dextrose and said aspartame is present in a quantity of about 0.5 gram per 100 grams of water, and wherein said composition further comprises benzoic acid in a quantity of from about 0.1 gram to about 0.5 gram per 100 grams of water, and sodium chloride in a quantity up to about 0.7 gram per 100 grams of water.

14. The composition in accordance with claim 1, wherein each of said xanthan gum and said hydroxy propyl methyl cellulose is present in a quantity of from about 0.1 to about 0.3 gram per 100 grams of water, and said taste-enhancing agent includes dextrose and aspartame, wherein each of said dextrose and said aspartame is present in a quantity of about 0.5 gram per 100 grams of water, and wherein said composition further comprises benzoic acid in a quantity of from about 0.1 gram to about 0.5 gram per 100 grams of water, sodium chloride in a quantity up to about 0.7 grams per 100 grams of water, and an edible flavoring agent functionally compatible in said composition wherein said edible flavoring agent is present in a quantity sufficient to produce a desired taste.

* * * * *